(12) United States Patent
Kumagai et al.

(10) Patent No.: US 7,127,822 B2
(45) Date of Patent: Oct. 31, 2006

(54) SURVEYING INSTRUMENT

(75) Inventors: Kaoru Kumagai, Itabashi-ku (JP); Fumio Ohtomo, Itabashi-ku (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 0 days.

(21) Appl. No.: 10/501,386

(22) PCT Filed: Sep. 2, 2003

(86) PCT No.: PCT/JP03/11193

§ 371 (c)(1), (2), (4) Date: Jul. 14, 2004

(87) PCT Pub. No.: WO2004/023073

PCT Pub. Date: Mar. 18, 2004

(65) Prior Publication Data

US 2005/0172503 A1    Aug. 11, 2005

(30) Foreign Application Priority Data

Sep. 3, 2002 (JP) .............................. 2002-258108

(51) Int. Cl.
*G01C 15/00* (2006.01)

(52) U.S. Cl. ....................................................... 33/290

(58) Field of Classification Search ................. 33/290, 33/286, 291, 292, DIG. 21
See application file for complete search history.

(56) References Cited

U.S. PATENT DOCUMENTS

| 4,717,251 A * | 1/1988 | Wells et al. ................ 356/4.08 |
|---|---|---|
| 5,055,666 A * | 10/1991 | Miyahara ................... 250/206.1 |
| 5,212,889 A * | 5/1993 | Lysen .......................... 33/286 |
| 6,504,602 B1 * | 1/2003 | Hinderling ................... 356/5.1 |
| 6,859,269 B1 * | 2/2005 | Ohtomo et al. ........... 356/141.1 |
| 2005/0207621 A1 * | 9/2005 | Murai et al. ................ 382/106 |

FOREIGN PATENT DOCUMENTS

| JP | 3-24971 | 4/1991 |
|---|---|---|
| JP | 6-186036 | 7/1994 |
| JP | 7-19874 | 1/1995 |
| JP | 8-43098 | 2/1996 |
| JP | 11-14357 | 1/1999 |
| JP | 11-194018 | 7/1999 |
| JP | 11-325891 | 11/1999 |
| JP | 2003-185436 | 7/2003 |

* cited by examiner

*Primary Examiner*—Christopher W. Fulton
(74) *Attorney, Agent, or Firm*—Nields & Lemack

(57) ABSTRACT

The present invention provides a surveying instrument (20), comprising a surveying instrument main unit (21) which projects a measuring light to an object to be measured and measures a position based on a reflection light from the object to be measured and an operation device (67) which is removably attached on the surveying instrument main unit, wherein the surveying instrument main unit comprises a distance measuring unit (54) and (55) for emitting the measuring light and for measuring a distance, an image pickup unit (51) and (53) for acquiring an image, a reflection mirror (45) rotatably mounted and used for directing the measuring light toward the object to be measured, for directing the reflected light from the object to be measured toward a light receiving unit, and for directing the image in a projecting direction toward the image pickup unit, a detecting means (31) for detecting a rotating position of the reflection mirror, and a control unit (74) for controlling at least the distance measuring unit, the image pickup unit and the rotating position of the reflection mirror, and wherein the operation device comprises a display unit for displaying the image acquired by the image pickup unit.

6 Claims, 6 Drawing Sheets

SURVEYING INSTRUMENT

FIELD OF THE INVENTION

The present invention relates to a surveying instrument capable of measuring a distance to a point of measurement target and of acquiring an image.

BACKGROUND ART

As a device for automatically measuring a position of a measurement target, an automatic surveying instrument has been known in the past, which comprises an automated total station comprising a distance measuring unit.

Referring to FIG. 7, description will be given below on a conventional type automatic surveying instrument.

A base unit 2 is disposed on a leveling unit 1. A frame unit 4 is mounted on the base unit 2 via a horizontal rotation shaft 3 so that it can be rotated in a horizontal direction. A body tube 6 is mounted on the frame unit 4 via a vertical rotation shaft 5 so that it can be rotated in a vertical direction.

A horizontal rotation gear 7 is mounted on the horizontal rotation shaft 3, and a horizontal rotating motor 8 is mounted on the base unit 2. A horizontal rotating driving gear 9 is engaged on an output shaft of the horizontal rotating motor 8, and the horizontal rotating driving gear 9 is engaged with the horizontal rotating gear 7. A horizontal angle detecting encoder 11 is provided between the horizontal rotation shaft 3 and the base unit 2.

The frame unit 4 is rotated in a horizontal direction by the horizontal rotating motor 8 via the horizontal rotating driving gear 9 and the horizontal rotating gear 7. A rotation angle is detected by the horizontal angle detecting encoder 11.

A vertical rotating gear 12 is engaged on the vertical rotation shaft 5. A vertical rotating motor 13 is mounted on the frame unit 4. A vertical rotating driving gear 14 is mounted on an output shaft of the vertical rotating motor 13, and the vertical rotating driving gear 14 is engaged with the vertical rotating gear 12. A vertical angle detecting encoder 15 is provided between the vertical rotation shaft 5 and the frame unit 4.

The body tube 6 is rotated in a vertical direction by the vertical rotating motor 13, and an angle in a vertical direction is detected by the vertical angle detecting encoder 15.

In the body tube 6, there are provided a collimating telescope 16, a distance measuring unit (not shown), and a tracking means for tracking a prism reflector (an object to be measured) installed on a measurement target. In the frame unit 4, there are provided a tilt sensor (not shown) for detecting tilt, the horizontal rotating motor 8, the vertical rotating motor 13, a control unit (not shown) for driving and controlling the distance measuring unit (not shown), an operation unit for operating the surveying instrument, a display unit (not shown) for displaying operating conditions, measurement results, etc., and a battery (not shown) for supplying electric power to the control unit, the horizontal rotating motor 8, and the vertical rotating motor 13.

In the conventional type surveying instrument as described above, as a construction for acquiring an image data in a collimating direction, an image sensor (not shown) is mounted on an ocular element of a collimating telescope 16 of the body tube 6 so that an image obtained through the collimating telescope 16 is outputted as an electric signal by the image sensor.

While monitoring a signal from the horizontal angle detecting encoder 11, the control unit drives the horizontal rotating motor 8 and rotates the frame unit 4 in a horizontal direction. While monitoring a signal from the vertical angle detecting encoder 15, it drives the vertical rotating motor 13 and rotates the body tube in a vertical direction. The collimating telescope 16 is collimated in a predetermined direction. A distance to the object to be measured is measured, or a data of an image around the measurement taget is acquired.

In recent years, there have been growing demands on the needs for the image data in association with the distance measuring data. For instance, the distance measuring data is displayed together with the image of the measuring point in order that the measuring point can be visually identified. Further, not only the image of the measuring point but also the image around the measuring point is often required. In addition, there are also demands on the needs for the distance measuring data using the image data as positional data by making the acquisition of the image data as the primary purpose.

The conventional type automatic surveying instrument basically performs measurement by accurately collimating the measurement target. The image data obtained by the conventional type automatic surveying instrument is acquired through the collimating telescope 16. It is the image within a very limited range including the measurement target, and it is a secondary data relating to the measuring point.

Further, the conventional type automatic surveying instrument performs surveying operation by collimating the measuring point one by one, and it is difficult to acquire the data by quickly changing the measuring point. When the measuring point is changed, it is impossible to continuously acquire the image during the process of change.

The continuous image data is often required when a bird's eye view image is to be prepared. In such case, the automatic surveying instrument must be installed at a position higher than the ground surface. In the conventional type, the data necessary for operating the automatic surveying instrument such as measuring condition, data acquiring condition, etc. must be directly inputted to the surveying instrument. The surveying operator must go up each time to a point where the automatic surveying instrument is installed, and it has been inconvenience.

Under the above circumstances, it is an object of the present invention to provide a surveying instrument, by which it is possible to acquire continuous image data in wider range and which has high maneuverability and good working efficiency.

DISCLOSURE OF THE INVENTION

The present invention provides a surveying instrument, comprising a surveying instrument main unit which projects a measuring light to an object to be measured and measures a position based on a reflection light from the object to be measured and an operation device which is removably attached on the surveying instrument main unit, wherein the surveying instrument main unit comprises a distance measuring unit for emitting the measuring light and for measuring a distance, an image pickup unit for acquiring an image, a reflection mirror rotatably mounted and used for directing the measuring light toward the object to be measured, for directing the reflected light from the object to be measured toward a light receiving unit, and for directing the image in a projecting direction toward the image pickup unit, a detecting means for detecting a rotating position of the reflection mirror, and a control unit for controlling at least the distance measuring unit, the image pickup unit and the rotating position of the reflection mirror, and wherein the operation device comprises a display unit for displaying the image acquired by the image pickup unit. Also, the present invention provides the surveying instrument as described above, wherein there is provided a leveling unit for adjusting tilt and for setting the surveying instrument main unit to a horizontal or a vertical position, and the operation device comprises operation switches for operating the leveling unit. Further, the present invention provides the surveying instrument as described above, wherein radio communication can be performed between the surveying instrument main unit and the operation device via transmitter/receivers, and the surveying instrument main unit can be operated from the operation device furnished separately. Also, the present invention provides a surveying instrument, comprising a surveying instrument main unit which projects a measuring light to an object to be measured and measures a position based on a reflection light from the object to be measured and an operation device, wherein the surveying instrument main unit comprises a distance measuring unit for emitting the measuring light and for measuring a distance, an image pickup unit for acquiring an image, a reflection mirror rotatably mounted and used for directing the measuring light toward the object to be measured, for directing the reflected light from the object to be measured toward a light receiving unit, and for directing the image in a projecting direction toward the image pickup unit, detecting means for detecting a rotating position of the reflection mirror, a control unit for controlling at least the distance measuring unit, the image pickup unit and the rotating position of the reflection mirror, and a first transmitter/receiver for receiving an operation signal for operation via the control unit and for transmitting an image data acquired by the image pickup unit, and wherein the operation device comprises a display unit and an operation unit to be operated according to programs, and a second transmitter/receiver being enable to operate the surveying instrument main unit from the operation device, enable to display the image data acquired by the image pickup unit, and capable to perform communication to and from the first transmitter/receiver. Further, the present invention provides the surveying instrument as described above, wherein the instrument comprises a leveling unit for adjusting tilt and for setting the surveying instrument main unit to a horizontal or a vertical position, and the leveling unit can be controlled by the operation device. Also, the present invention provides the surveying instrument as described above, wherein the operation device comprises an operation unit to be operated according to programs, and a display unit for displaying the image data, the programs are provided with a function to indicate operation procedure for surveying operation to the display unit, and the surveying instrument main unit is controlled according to the displayed operating procedure. Further, the present invention provides the surveying instrument as described above, wherein the first and the second transmitter/receivers transmit and receive data to and from each other, in which data for communication are established based on a common protocol. Also, the present invention provides the surveying instrument as described above, wherein a distance measuring data and an image data with respect to the object to be measured are acquired from two or more directions, and a 3-dimensional image of the object to be measured is composed based on the distance measuring data and the image data.

BEST MODE FOR CARRYING OUT THE INVENTION

Figure 1:
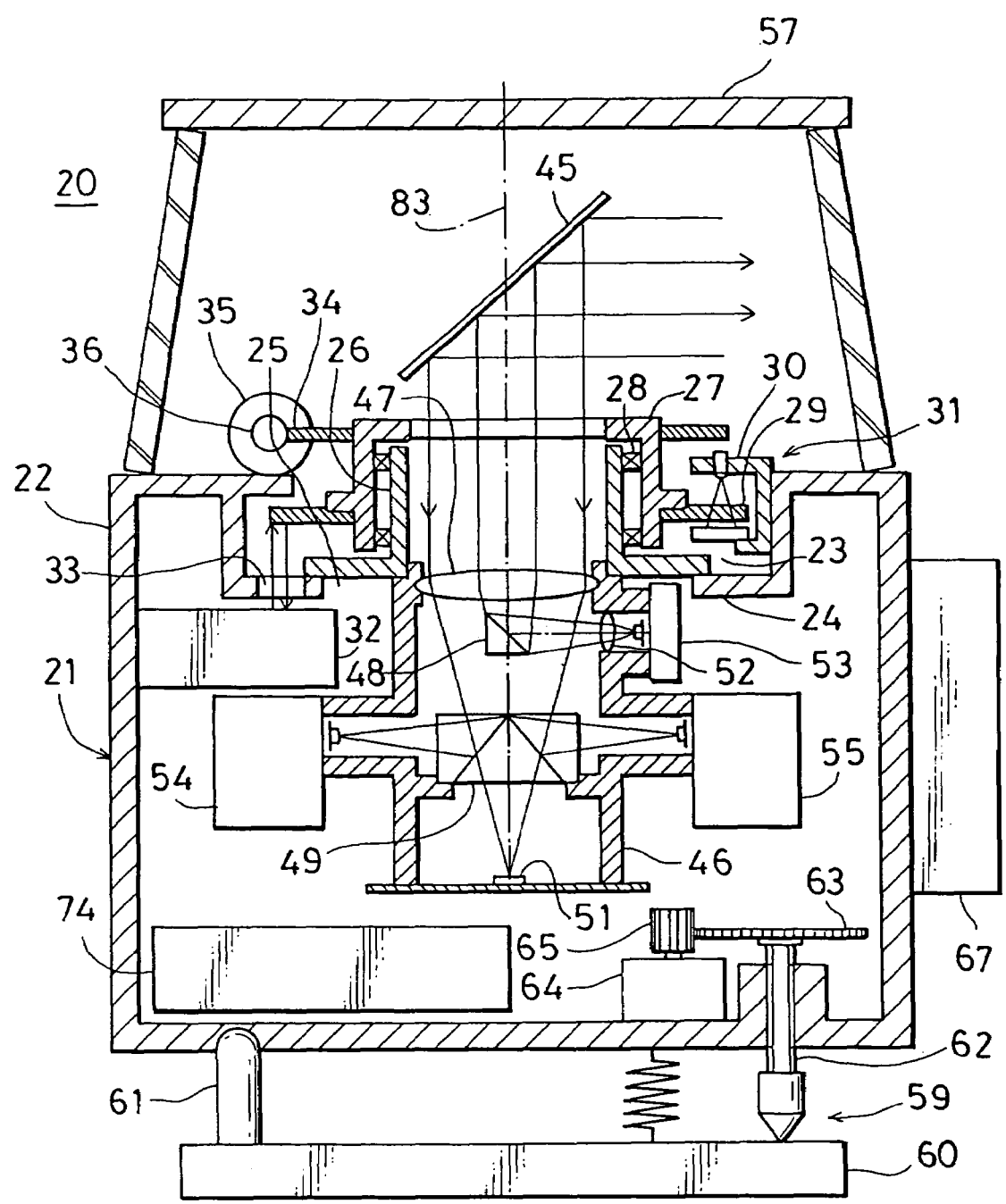
FIG. 1 is a cross-sectional elevation view of an embodiment of the present invention.
Figure 2:
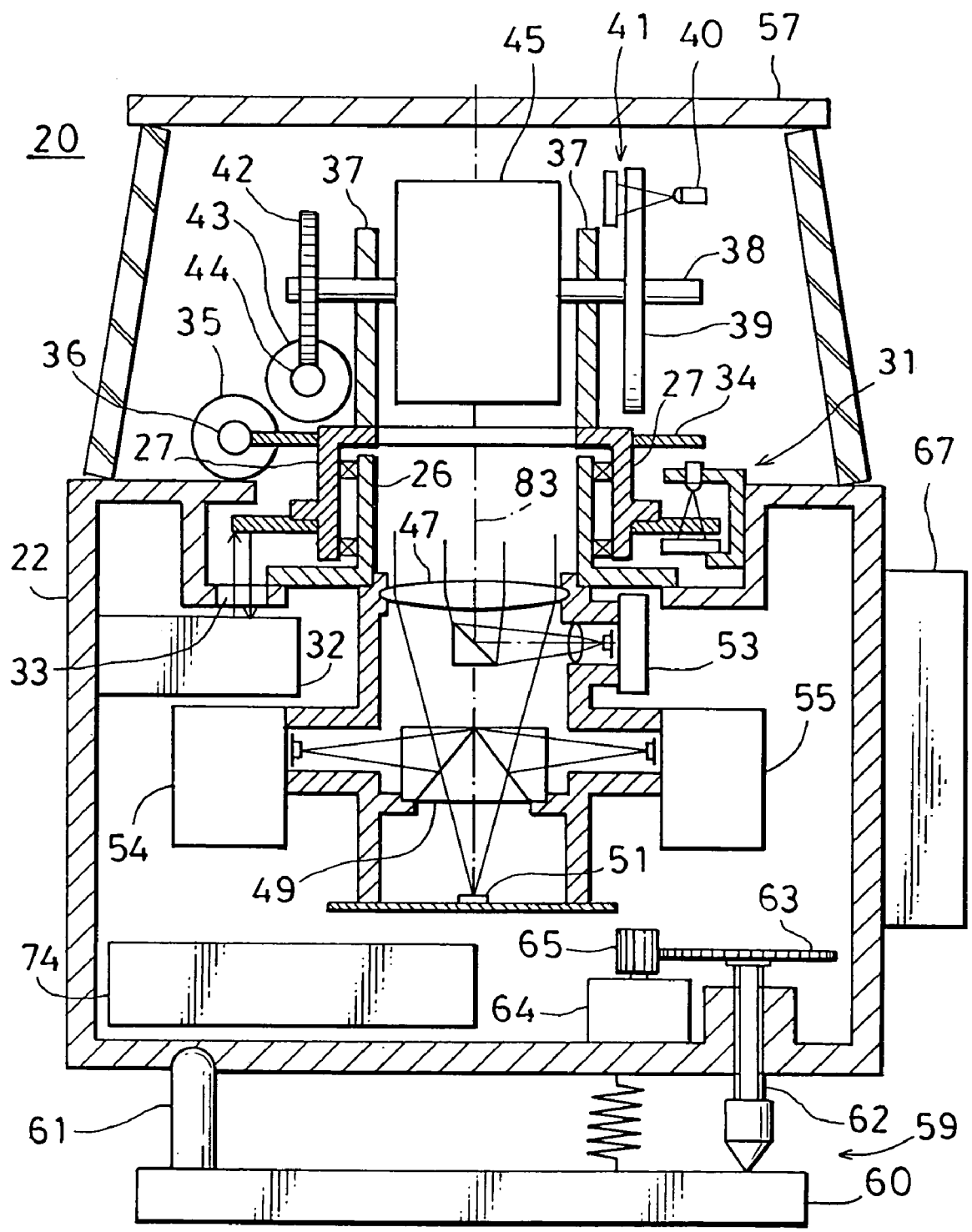
FIG. 2 shows an embodiment of the present invention, and it is a cross-sectional elevation view when a reflection mirror is rotated.

Description will be given below on embodiments of the present invention referring to the drawings.

A surveying instrument 20 comprises a surveying instrument main unit 21, a leveling unit 59, and an operation device 67 removably mounted on a main unit case 22.

First, the surveying instrument main unit 21 will be described.

A recessed portion 23 is formed on an upper surface of the main unit case 22. On the recessed portion 23, a hole 25 is formed so that a flange 24 is provided around it. A flanged hollow shaft 26 is mounted in the flange 24 concentrically with the hole 25, and a rotating unit 27 is rotatably engaged on the flanged hollow shaft 26 via bearings 28. On the rotating unit 27, a pattern ring 29 for an encoder is arranged perpendicularly to a rotation shaft of the rotating unit 27. A detector 30 is provided on an inner peripheral wall surface of the recessed portion 23 to face the pattern ring 29. The detector 30 and the pattern ring 29 make up together a horizontal angle encoder 31.

Inside the main unit case 22, an optical type tilt measuring unit 32 is arranged so as to oppose the pattern ring 29 on the opposite side of the flange 24 from the pattern ring 29. The tilt measuring unit 32 emits a tilt detecting light to the pattern ring 29 through the window hole 33 formed on the flange 24. The tilt measuring unit 32 has a free liquid surface in it so that a relative angle between the free liquid surface and the pattern ring 29, i.e. a tilt angle of the pattern ring 29 with respect to a horizontal line, can be detected through comparison of a reflection light from the free liquid surface with a reflection light from the pattern ring 29. The result of the detection at the tilt measuring unit 32 is inputted to a control unit 74 as to be described later.

A worm wheel 34 is engaged on an upper end of the rotating unit 27. A horizontal rotating motor 35 is arranged on an upper surface of the main unit case 22, and a worm gear 36 mounted on an output shaft of the horizontal rotating motor 35 is engaged with the worm wheel 34.

A pair of brackets 37 and 37 placed at positions opposite to each other are erected on an upper surface of the rotating unit 27, and a horizontal rotation shaft 38 is rotatably mounted between the brackets 37 and 37. A pattern ring 39 of an elevation angle encoder 41 is fixed on one end of the horizontal rotation shaft 38, and a detector 40 to match the pattern ring 39 is provided on the rotating unit 27. A worm wheel 42 is engaged on the other end of the horizontal rotation shaft 38, and a vertical rotating motor 43 is mounted on the upper surface of the rotating unit 27. A worm gear 44 engaged with an output shaft of the vertical rotating motor 43 is engaged with the worm wheel 42.

A reflection mirror 45 is fixed on the horizontal rotation shaft 38.

A body tube 46 is mounted on a lower end of the flanged hollow shaft 26, and the body tube 46 is coaxial with the flanged hollow shaft 26. Along a center line of the body tube 46, there are provided from above the following components: an objective lens 47, a small mirror 48, a dichroic prism 49 for reflecting a light beam of a predetermined wavelength range, and an image light receiving unit 51. As the image light receiving unit 51, a CCD sensor is used, for instance.

A condenser lens 52 and a light emitting unit 53 for image acquisition are arranged along an optical axis of a reflection light from the small mirror 48. A measuring light emitting unit 54 is placed on one side opposing to the dichroic prism 49, and a measuring light detecting unit 55 is disposed on the other side opposing to the dichroic prism 49.

The light emitting unit 53 for image acquisition and the image light receiving unit 51 make up together an image pickup unit 50. The measuring light emitting unit 54 and the measuring light detecting unit 55 make up together a distance measuring unit 56.

Reference numeral 74 denotes a control unit comprising a power source unit such as a battery.

On the upper surface of the main unit case 22, there is provided a cover 57, which watertightly covers the reflection mirror 45, the horizontal rotating motor 35, etc. The cover 57 is made of a transparent material such as glass.

Next, description will be given on the leveling unit 59.

A pillar 61 is erected on a base 60. The pillar 61 has its tip designed in a spherical shape, and its tip is tiltably engaged with a recess formed on a lower surface of the main unit case 22. At positions of other two vertexes of a triangle, which has its top vertex at a position of the pillar 61, level adjusting screws 62 (one of them is not shown in the figure) which are screwed in and penetrating through the bottom surface of the main unit case 22 are disposed. On upper ends of the level adjusting screws 62, gears 63 are mounted. A level adjusting motor 64 is arranged on the bottom surface of the main unit case 22, and a pinion gear 65 is mounted on an output shaft of the level adjusting motor 64. The pinion gear 65 is engaged with the gears 63. The level adjusting motor 64 is driven and controlled by the control unit 74.

The operation device 67 comprises a transmitter/receiver 68 capable of performing data communication via radio with a transmitter/receiver 75, and, further, comprises an operation unit 69 and a display unit 70.

Figure 3:
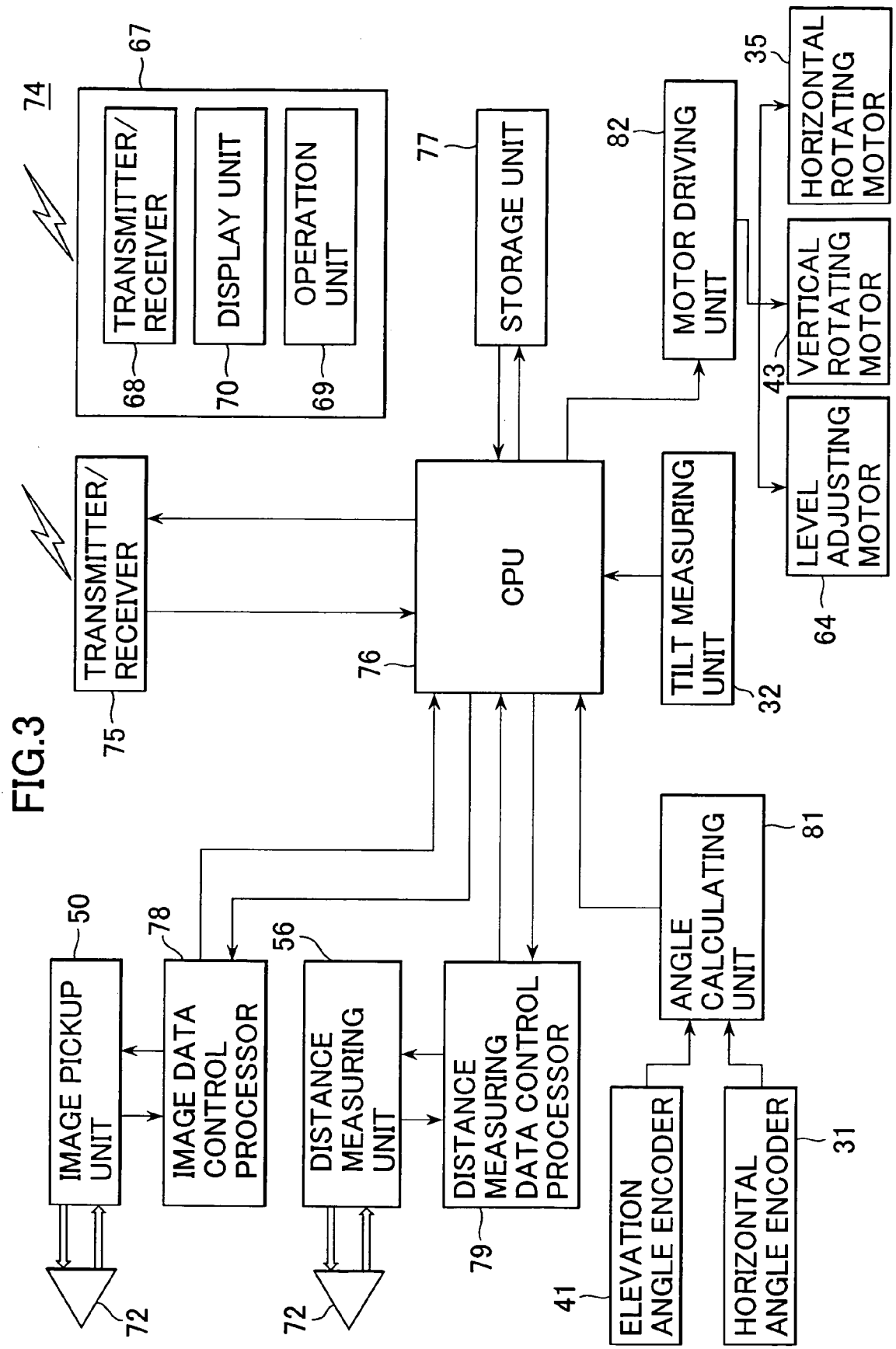
FIG. 3 is a control block diagram of the embodiment of the present invention.

Now, description will be given on the control unit 74 referring to FIG. 3.

The control unit 74 comprises the transmitter/receiver 75, an arithmetic unit (CPU) 76, a storage unit 77, an image data control processor 78, a distance measuring data control processor 79, an angle calculating unit 81, a motor driving unit 82, etc. The storage unit 77 comprises a program necessary for automatic tracking of an object to be measured (reflection prism) 72, and a sequence program necessary for compensating the measuring route data from the position of the object to be measured on the image distance measurement and angle measurement, and image acquisition, and a program for displaying operation guidance to improve working efficiency of a surveying operator.

The image data control processor 78 converts a signal obtained at the image pickup unit 50 to a signal required such as image data and outputs it to the arithmetic unit 76.

The distance measuring data control processor 79 calculates a distance measuring data to the object to be measured 72 based on the signal obtained at the distance measuring unit 56, and this is outputted to the arithmetic unit 76.

Based on the signals from the horizontal angle encoder 31 and from the elevation angle encoder 41, the angle calculating unit 81 calculates a projecting direction of a measuring light, and the result of the calculation is inputted to the arithmetic unit 76. Also, from the tilt measuring unit 32, vertical condition of a central axis of the body tube 46, i.e. an optical axis 83, is inputted to the arithmetic unit 76.

The arithmetic unit 76 records the data from each of the image data control processor 78 and the distance measuring data control processor 79 in the storage unit 77, or the image data is associated with the distance measuring data, and this is recorded in the storage unit 77.

Description will be given below on operation.

Figure 4:
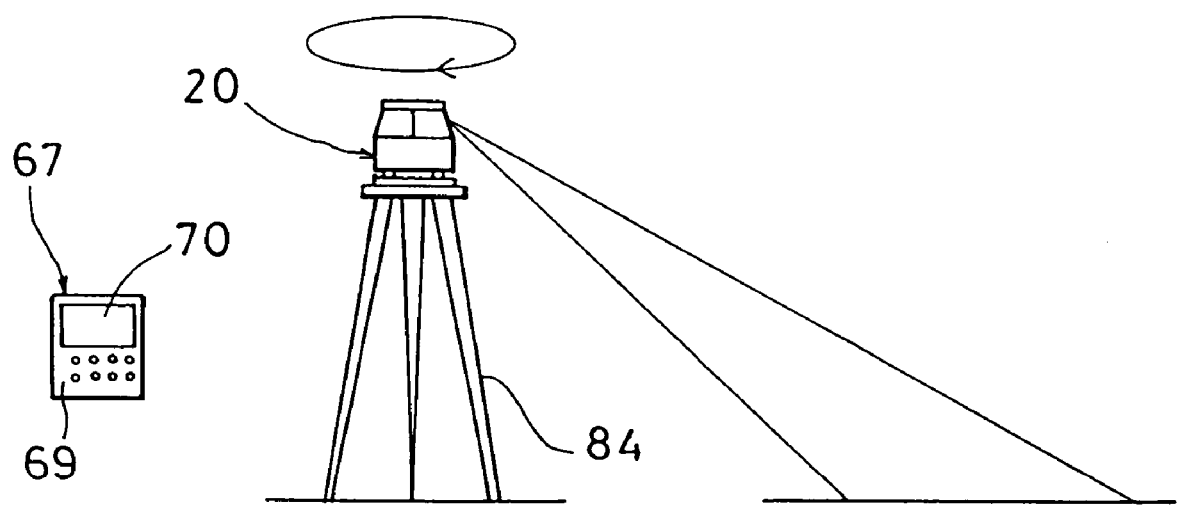
FIG. 4 is a schematical drawing to explain the embodiment of the present invention in surveying operation.

As shown in FIG. 4, the surveying instrument 20 is installed, for instance, on a tripod 84 of about several meters in height, or it is installed on a known structure (not shown).

The operation device 67 can be freely attached to or detached from the surveying instrument main unit 21. The surveying instrument 20 can be operated with the operation device 67 mounted on the surveying instrument main unit 21.

As shown in FIG. 4, in case the surveying instrument 20 is installed at a place, to which the surveying operator cannot gain access, the operation device 67 is detached from the surveying instrument main unit 21, and it is operated by remote control operation.

The surveying instrument 20 is installed at a known point via the tripod 84. When data such as measuring conditions are inputted by the operating unit 69 of the operating device 67, a command signal is issued from the transmitter/receiver 68, and it is received at the transmitter/receiver 75.

The received signal is inputted to the arithmetic unit 76. The arithmetic unit 76 starts a measurement program recorded in the storage unit 77.

When the measurement is started, the measurement program carries out leveling operation of the surveying instrument main unit 21. Leveling operation is performed separately from the surveying operation so that the leveling operation can be carried out independently. Operation switches (not shown) for the leveling operation are arranged on the operation device 67. The conditions of the leveling operation are transmitted from the transmitter/receiver 75, and the leveling conditions are displayed on the display unit 70.

When the leveling operation is started, the arithmetic unit 76 drives and controls the level adjusting motor 64 via the motor driving unit 82 based on the signal from the tilt measuring unit 32, and tilting of the surveying instrument main unit 21 is corrected so that the optical axis 83 is directed to the vertical line.

The image pickup unit 50 is driven via the image data control processor 78. A measuring light is emitted from the measuring light emitting unit 54. The measuring light is reflected by the dichroic prism 49 and is directed toward the reflection mirror 45. The distance measuring unit 56 is driven via the distance measuring data control processor 79. A light for image acquisition is emitted from the light emitting unit 53 for image acquisition. It is reflected by the small mirror 48 and is directed toward the reflection mirror 45.

In parallel to the above operation, the horizontal rotating motor 35 and the vertical rotating motor 43 are driven via the motor driving unit 82, and the reflection mirror 45 is rotated horizontally and vertically. The light for image acquisition to track and measure the object to be measured 72 irradiated via the reflection mirror 45 is reflected by the object to be measured 72. The light enters the image light receiving unit 51 via the reflection mirror 45.

In response to the horizontal rotation and vertical rotation of the reflection mirror 45, the image pickup unit 50 acquires the image. Based on the image acquired from the image pickup unit 50, the image data control processor 78 identifies the object to be measured 72. Then, the position in the image is calculated, and this is inputted to the arithmetic unit 76. The arithmetic unit 76 calculates and determines the direction of the object to be measured 72 from the position of the object to be measured 72 in the image and from an elevation angle and a horizontal angle acquired from the angle calculating unit 81 at the moment.

Based on the direction of the object to be measured 72 thus calculated and determined, the horizontal rotating motor 35 and the vertical rotating motor 43 are driven, and the measuring light emitted from the light emitting unit 53 for image acquisition is directed toward the object to be measured 72 via the reflection mirror 45.

The reflected measuring light from the object to be measured 72 is received by the measuring light detecting unit 55. Based on a signal from the measuring light detecting unit 55, the distance measuring unit 56 measures a distance to the object to be measured 72.

The measured distance is associated with the elevation angle, the horizontal angle and the image data and it is recorded in the storage unit 77. Also, it is sent to the operation device 67 via the transmitter/receiver 75. On the display unit 70, the distance measuring data such as the measured distance, the elevation angle, the horizontal angle, etc. are displayed together with an image of the surroundings including the object to be measured 72.

When it is wanted to acquire an image in wider range around the object to be measured 72, the reflection mirror 45 is rotated by horizontal rotation and vertical rotation in the required range of angle around the object to be measured 72. Each time the direction of the reflection mirror 45 is changed by a predetermined angle, an image is acquired by the image pickup unit 50, and the image is turned to data by the image data control processor 78. The horizontal angle and the elevation angle at the time of image acquisition are detected via the horizontal angle encoder 31, the elevation angle encoder 41, and the angle calculating unit 81. The detected horizontal angle and elevation angle are associated with the acquired image data, and they are recorded in the storage unit 77.

By composing the acquired image data, an image in wider range can be obtained.

Next, the tripod 84 is moved to another known point to change the position of the surveying instrument 20. Surveying operation is performed on the object to be measured 72 from a different direction, and an image data of the surroundings including the object to be measured 72 is acquired with respect to the object to be measured 72.

Where there are two or more objects to be measured 72, the same procedure is performed to acquire the distance measuring data and the image data one after another.

When the distance measuring data and the image data are acquired of the object to be measured 72 from two directions and the data are composed, a 3-dimensional image can be obtained.

Figure 5:
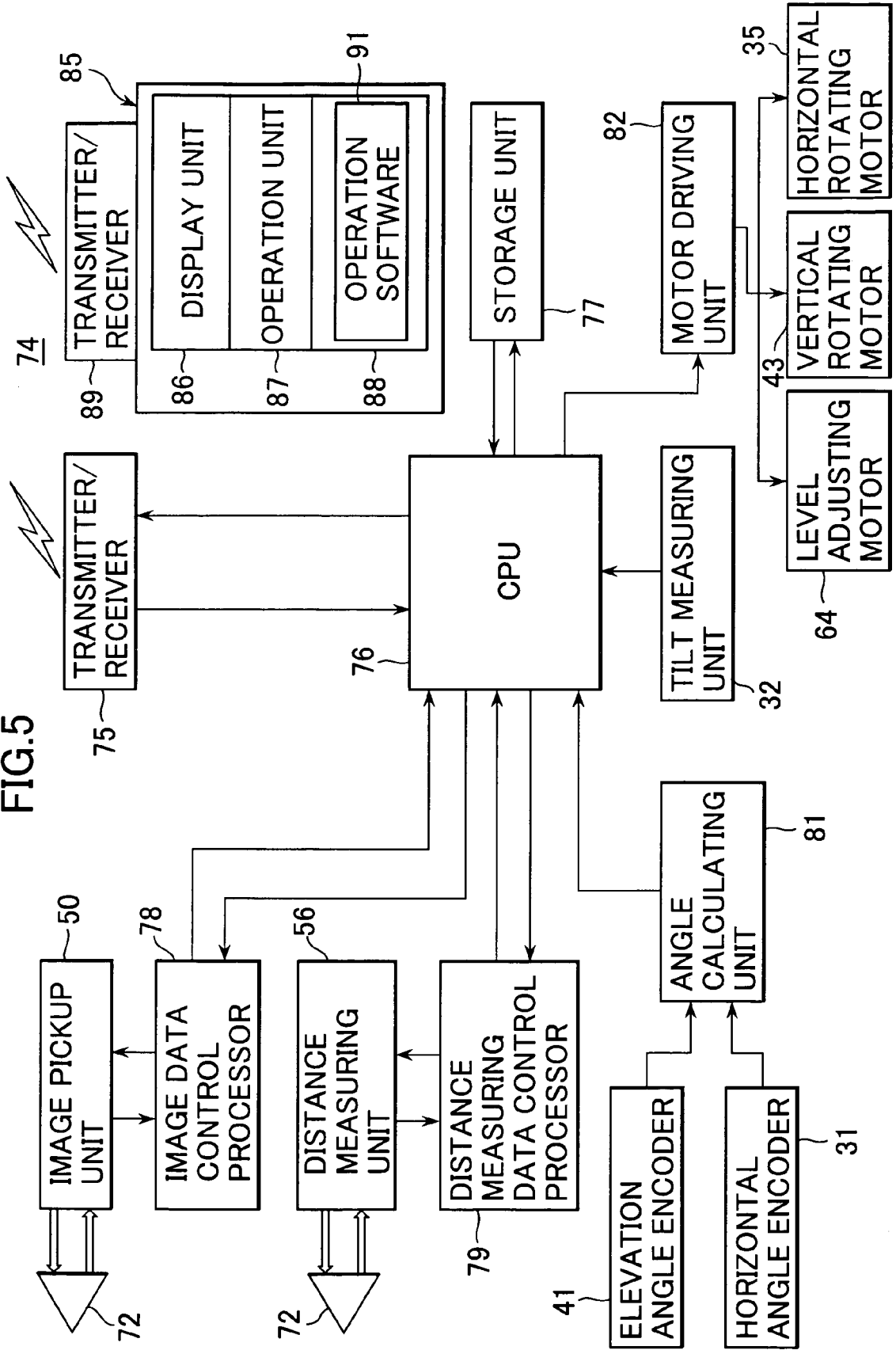
FIG. 5 is a control block diagram of another embodiment of the invention.
Figure 6:
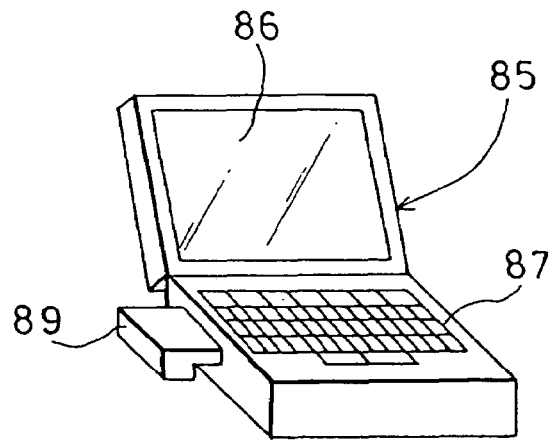
FIG. 6 is a perspective view to explain an operation device of another embodiment of the invention.
Figure 7:
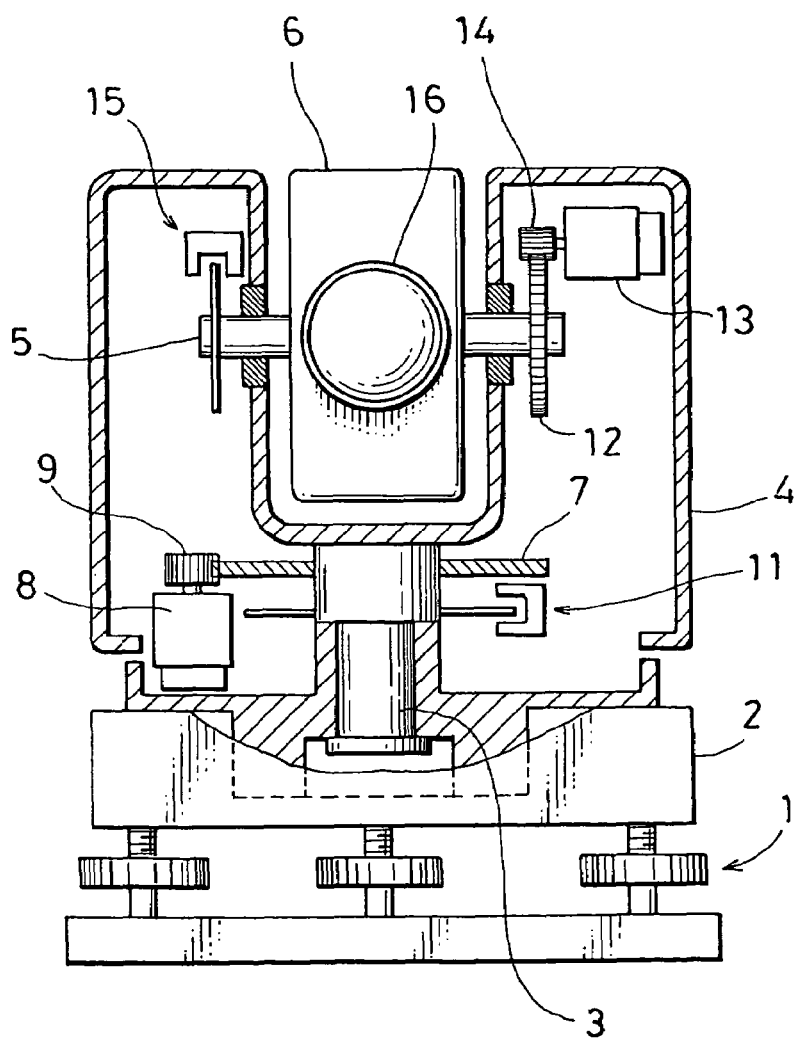
FIG. 7 is a partially cutaway front view of a conventional example.

FIG. 5 and FIG. 6 show another embodiment of the invention. In the figures, the same component as shown in FIG. 3 is referred by the same symbol, and detailed description is not given here.

In this another embodiment, the surveying instrument main unit 21 is operated by a general-purpose operation device 85 instead of the operation device 67. In this case, the operation device 67 may be fixed on the surveying instrument main unit 21 or it may not be used.

As the operation device 85, a device such as a notebook-sized personal computer may be used, which comprises a display unit 86, an operation unit 87, and a storage unit 88. Or, a smaller-size PDA, etc. may be used. An operation software 91 for operating the surveying instrument 20 is stored in the storage unit 88 such as a hard disk of the operation device 85. A transmitter/receiver 89, for instance, a card-type transmitter/receiver 89, is inserted in a card slot of the notebook-sized personal computer. The operation software 91 has functions to process the data transmitted from the surveying instrument 20 and to display the data on the display unit 86. The operation software 91 is provided with a function of operation guidance to improve working efficiency of the surveying operator and displays the details of necessary operation along with the flow of operation.

When the operation software 91 is started from the operation unit 87 and the measuring conditions, etc. are inputted, a command signal is issued from the transmitter/receiver 89, and the command signal is received by the transmitter/receiver 75.

The received signal is inputted to the arithmetic unit 76, and the arithmetic unit 76 starts the measurement program recorded in the storage unit 77.

When the measurement is started, the leveling of the surveying instrument main unit 21 is performed. Then, the distance measuring data and the image data are acquired in the same manner as given above. The distance measuring data and the image data thus acquired are transmitted from the transmitter/receiver 75 and are received by the transmitter/receiver 89 and are incorporated in the operation device 85. For the transmission and receiving between the transmitter/receiver 75 and the transmitter/receiver 89, a digital signal is used, which has the data for communication established based on a common protocol.

When the general-purpose operation device 85 is used as the operation device, a large amount of data can be recorded if the measured distance data and the image data are stored in the storage unit 88 on the side of the operation device 85. Further, it is possible to perform the data processing such as image composite in parallel with the surveying operation, and this contributes to the higher working efficiency.

INDUSTRIAL APPLICABILITY

As described above, the present invention provides a surveying instrument, comprising a surveying instrument main unit which projects a measuring light to an object to be measured and measures a position based on a reflection light from the object to be measured and an operation device which is removably attached on the surveying instrument main unit, wherein the surveying instrument main unit comprises a distance measuring unit for emitting the measuring light and for measuring a distance, an image pickup unit for acquiring an image, a reflection mirror rotatably mounted and used for directing the measuring light toward the object to be measured, for directing the reflected light from the object to be measured toward a light receiving unit, and for directing the image in a projecting direction toward the image pickup unit, a detecting means for detecting a rotating position of the reflection mirror, and a control unit for controlling at least the distance measuring unit, the image pickup unit and the rotating position of the reflection mirror, and wherein the operation device comprises a display unit for displaying the image acquired by the image pickup unit. As a result, it is possible to acquire a continuous image data in wider range and to compose a 3-dimensional image by acquiring image data of the object to be measured from two or more directions, and high maneuverability and high working efficiency are secured.

What is claimed is:

1. A surveying instrument, which projects a measuring light to an object to be measured and measures a position based on a reflection light from the object to be measured, comprising a distance measuring unit for emitting the measuring light and for measuring a distance, an image pickup unit for acquiring an image via a light receiving unit, a reflection mirror rotatably mounted in a vertical direction around a horizontal center line and in a horizontal direction around a vertical center line, and used for directing the measuring light toward the object to be measured, for directing the reflected light from the object to be measured toward a light receiving unit, and for directing the image in a projecting direction toward said image pickup unit, rotating means for rotating said reflection mirror in the horizontal direction and in the vertical direction, detecting means for detecting a horizontal angle and an elevation angle of said reflection mirror, and a control unit for calculating a direction to the object to be measured based on the detected horizontal angle, the detected elevation angle and a light receiving position of the reflection light on said light receiving unit, and for rotating said reflection mirror, based on the result of said calculation, by controlling said rotating means so as to collimate a reflected measuring light with the object to be measured, for measuring a distance to the object to be measured, and for calculating a position of the object to be measured based on the measured distance to the object to be measured and based on the calculated direction to the object to be measured.

2. A surveying instrument according to claim 1, comprising an operation device furnished separately, wherein said surveying instrument can be operated by radio communication from said operation device.

3. A surveying instrument according to claim 1, comprising a removable operation device, wherein said operation device comprises an operation unit to be operated according to programs, and a display unit for displaying the image data, said programs are provided with a function to indicate operation procedure for surveying operation to said display unit, and said surveying instrument is controlled according to the displayed operating procedure.

4. A surveying instrument according to claim 1, wherein a distance measuring data and an image data with respect to the object to be measured are acquired from two or more directions, and a 3-dimensional image of the object to be measured is composed based on the distance measuring data and the image data.

5. A surveying instrument according to claim 1, wherein two or more image data acquired by said image pickup unit are associated with the horizontal angles when the two or more images are acquired respectively, the elevation angles when the two or more images are acquired respectively, and the measured distances when the two or more images are acquired respectively, and the two or more images are composed with a wider range image including an image around the object to be measured.

6. A surveying instrument according to claim 1, comprising an operation device, wherein said operation device comprises an operation unit which can select measuring conditions, and a measurement program, wherein said measurement program performs measurement based on the selected measuring conditions.

* * * * *